June 19, 1951 S. G. JOHNSON 2,557,293
MULTIPLE SECTION FRAME GAUGE
Filed May 22, 1946
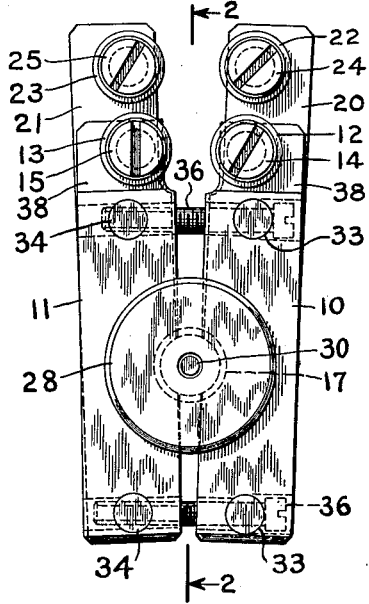
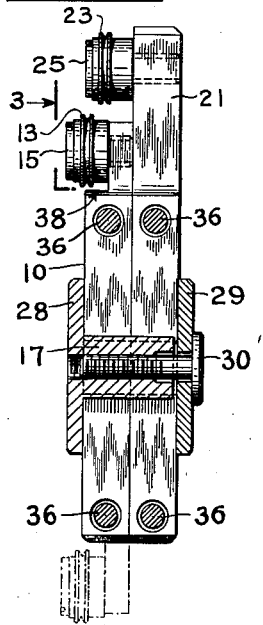
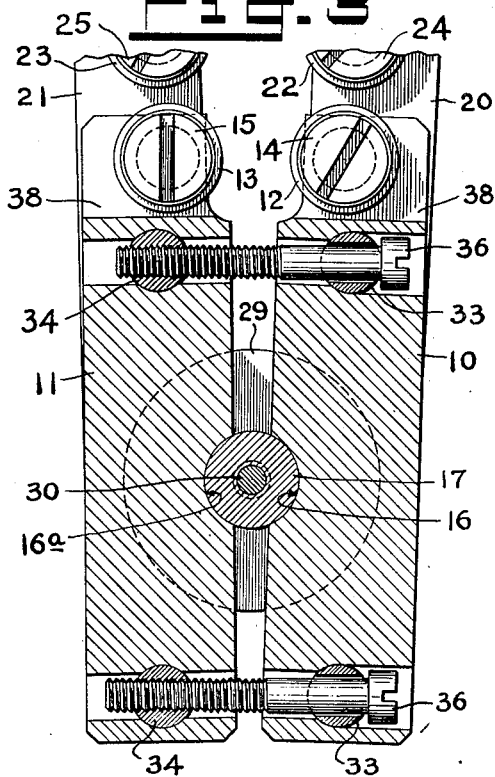
*INVENTOR.*
STANLEY G. JOHNSON
BY
*ATTORNEYS*

Patented June 19, 1951

2,557,293

UNITED STATES PATENT OFFICE 2,557,293

MULTIPLE SECTION FRAME GAUGE

Stanley G. Johnson, West Hartford, Conn.

Application May 22, 1946, Serial No. 671,530

12 Claims. (Cl. 33—154)

The invention relates to a multiple section frame gage which comprises a plurality of pairs of gaging means which are so mounted that they may be rotated with respect to each other into any desired relative angular position. There may be times when the inspector using the gage desires the gaging means to be in alignment. At other times he may desire the gaging means to be angularly spaced from each other a few degrees or as much as 180°. The gage herein is capable of adjustment so that the gaging means may be in any desired relative angular position with respect to each other.

It is an object of the invention to construct a gage including a plurality of pairs of gaging means, at least one of which is rotatable with respect to another so that any relative angular position desired may be assumed therebetween.

Another object of the invention is to construct a gage with a plurality of pairs of gaging means in which each pair is carried by a frame including a pair of arms which embrace a pivot, and each pair of arms are retained upon the pivot by screw means which serve also as the means for adjusting the spacing between the pair of gaging elements.

Other objects of the invention will be more apparent from the following description taken in connection with the accompanying drawings illustrating the preferred embodiments thereof in which Figure 1 is a plan view of the gage with the gaging frames and gaging elements in alignment.

Figure 2 is a section taken on line 2—2 of Figure 1.

Figure 3 is a section taken on line 3—3 of Figure 2.

The gage comprises a plurality of frames, two being shown, the first frame including a pair of arms 10 and 11, each of which carries a gaging means 12 and 13 respectively upon pivots 14 and 15 respectively. Each arm has a pivot bearing 16 and 16a respectively which preferably is less than 180° and receives a pivot pin 17.

The gage includes a second frame which may comprise a pair of arms 20 and 21 upon the end of which are carried gaging means 22 and 23 respectively which are mounted upon pivots 24 and 25 respectively. Each arm also carries a pivot bearing similar to bearings 16 and 16a which receive the pivot pin 17. The gaging means may be of any desired form, rollers being shown which for a thread gage would carry thread engaging ribs. The frames are carried in side by side relation upon the pivot pin 17 so that one may be swung into in line position with respect to the other.

The pivot pin carries a flange 28 against which the arms 10 and 11 abut. A collar 29 is carried upon the other end of the pivot 17 by means of a screw 30. The pivot pin is slightly shorter in length than the combined width of the arms of the frames so that tightening of the screw 30 clamps the frames in adjusted position between the flange 28 and collar 29.

Means are provided having the double function of adjusting the gaging separation or space between each pair of gaging means and also of securing the pair of arms forming each frame upon the pivot. This means includes a pin 33 swivelly carried by arm 10, and pin 34 swivelly carried by arm 11. The pin 33 has a hole therein through which a clamping and adjusting screw 36 passes. The threaded portion of the clamping screw is threaded into the pin 34. A similar clamping means is carried by the pair of arms on the other side of the pivot pin 17. By loosening one screw and tightening the other, the angular relation between the arms of one frame may be adjusted and thereby adjust the gage spacing between the gaging means. The two clamping or adjusting screws also retain the arms of the frame upon the pivot pin 17. Similar adjusting screws are carried by the frame formed by the arms 20 and 21. Each pair of gaging means may therefore be adjusted with respect to the other in order to obtain the proper spacing therebetween. At the same time the two arms of each frame are retained upon the pivot pin 17.

The gaging means for each frame are spaced a different radial distance from the axis of the pivot 17. The frame formed by the arms 10 and 11 may therefore swing into alignment with the gaging means 22 and 23, so that the latter may serve as a go gage and the former as a not-go gage. The gaging means 22 and 23 may be gaging rollers with a plurality of gaging ribs thereon. The ends 32 of the arms 10 and 11 are cut away so that the gaging means 12 and 13 are brought into substantially the same plane as the gaging means 22 and 23.

Although each frame is made up of a pair of arms, and each is rotatable upon the pivot 17, it is clear that in order to change the angular relation between each frame, one frame may be fixed and the other rotated on the pivot. If it is desired to swing one frame and its gaging means to a position not in alignment with the other, the screw 30 is unloosened, whereupon the frames are freely rotatable upon the pivot pin 17 and either of the two frames may be set in any desired adjusted position angularly with respect to the other. The screw means 36 may serve a third purpose namely to clamp the frame upon the pivot 17. It is more difficult to set the gaging means to the proper dimension or tolerance if the screw means 36 also clamps the frame on the pivot. It is for this reason that the separate clamping means is provided in the clamping collar 29 and screw 30.

The invention is presented to fill a need for improvements in a multiple section frame gage. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A multiple section gage comprising a pivot; gaging means mounted upon the pivot including a first frame carried by the pivot, a first pair of spaced gaging elements carried by the frame, each gaging element of the pair being fixed at an equal distance from the pivot, and means to adjust the spacing between the gaging elements in a direction tangential with respect to the pivot center; and a second gaging means adjustable as to the angular relation between the two gaging means including a second frame pivotally carried upon the pivot in side by side relation with the first frame for in-line positioning therewith and adjustable angularly upon the pivot with respect to the first frame, a second pair of spaced gaging elements carried upon the second frame and located a radial distance from the pivot axis thereof which is different from the radial distance therefrom of the first pair of gaging elements, each gaging element of the second pair being fixed at an equal distance from the pivot, and means to adjust the spacing between the second gaging elements in a direction tangential with respect to the pivot center.

2. A multiple section gage comprising a pivot; gaging means mounted upon the pivot including a first frame carried by the pivot, a first pair of spaced gaging elements carried by the frame, each gaging element of the pair being fixed at an equal distance from the pivot, and means to adjust the spacing between the gaging elements in a direction tangential with respect to the pivot center; and a second gaging means adjustable as to the angular relation between the two gaging means including a second frame pivotally carried upon the pivot in side by side relation with the first frame for in-line positioning therewith and adjustable angularly upon the pivot with respect to the first frame, a second pair of spaced gaging elements carried upon the second frame and located a radial distance from the pivot axis thereof which is different from the radial distance therefrom of the first pair of gaging elements, each gaging element of the second pair being fixed at an equal distance from the pivot, the two pairs of gaging elements being carried by their respective frames in approximately the same plane, and means to adjust the spacing between the second gaging elements in a direction tangential with respect to the pivot center.

3. A multiple section gage comprising a pivot; gaging means mounted upon the pivot including a first frame carried by the pivot, a first pair of spaced gaging elements carried by the frame, each gaging element of the pair being fixed at an equal distance from the pivot, and means to adjust the spacing between the gaging elements in a direction tangential with respect to the pivot center; a second gaging means adjustable as to the angular relation between the two gaging means including a second frame pivotally carried upon the pivot in side by side relation with the first frame for in-line positioning therewith and adjustable angularly upon the pivot with respect to the first frame, a second pair of spaced gaging elements carried upon the second frame and located a radial distance from the pivot axis thereof which is different from the radial distance therefrom of the first pair of gaging elements, each gaging element of the second pair being fixed at an equal distance from the pivot, and means to adjust the spacing between the second gaging elements in a direction tangential with respect to the pivot center; and means to lock the frames in relative angularly adjusted position.

4. A multiple section gage comprising a pivot; gaging means mounted upon the pivot including a first frame carried by the pivot, a first pair of spaced gaging elements carried by the frame, each gaging element of the pair being fixed at an equal distance from the pivot, and means to adjust the angular relation between the gaging elements in a direction tangential with respect to the pivot center; a second gaging means including a second frame pivotally carried upon the pivot in side by side relation with the first frame for in-line positioning therewith and adjustable angularly upon the pivot with respect to the first frame, a second pair of spaced gaging elements carried by the second frame, the second gaging elements being located a radial distance from the axis of the pivot which is different from the radial distance therefrom of the first pair of gaging elements, each gaging element of the second pair being fixed at an equal distance from the pivot, the two pairs of gaging elements being carried by their respective frames in approximately the same plane, and means to adjust the angular relation between the second gaging elements in a direction tangential with respect to the pivot center; and means to lock the frames in relative angularly adjusted position.

5. A multiple section gage comprising a pivot having a flange; gaging means mounted upon the pivot including a first frame pivotally carried upon the pivot, a first pair of spaced gaging elements carried by the frame, each gaging element of the pair being fixed at an equal distance from the pivot, and means to adjust the spacing between the gaging elements in a direction tangential with respect to the pivot center; a second gaging means adjustable as to the angular relation between the two gaging means including a second frame pivotally carried upon the pivot in side by side relation with the first frame for inline positioning therewith and adjustable angularly upon the pivot with respect to the first frame, a second pair of spaced gaging elements carried upon the second frame and located a radial distance from the axis thereof which is different from the radial distance therefrom of the first pair of gaging elements, each gaging element of the second pair being fixed at an equal distance from the pivot, and means to adjust the spacing between the second gaging elements in a direction tangential with respect to the pivot center; the length of the pivot being less than the combined widths of the two frames, and a clamping plate carried by the pivot to lock the frames in relative angularly adjusted position.

6. A multiple section gage comprising a pivot; gaging means mounted upon the pivot including a first frame carried by the pivot having a pair of arms, each arm having a pivot bearing to receive the pivot, a gaging element carried by each arm and forming a first pair of spaced gaging elements, and means to adjust the angular relation between the two arms and hence adjust the spacing between the gaging elements; and a second gaging means including a second frame pivotally carried upon the pivot and adjustable angularly upon the pivot with respect to the first frame, a second pair of spaced gaging elements carried by the second frame, the second gaging elements being located a radial distance from the axis of the pivot which is different from the radial distance therefrom of the first pair of gaging elements, and means to adjust the spacing between the second gaging elements.

7. A multiple section gage comprising a pivot; gaging means mounted upon the pivot including a first frame carried by the pivot having a pair of arms, each arm having a pivot bearing to receive the pivot, a gaging element carried by each arm and forming a first pair of spaced gaging elements, and means to adjust the angular relation between the two arms and hence adjust the spacing between the gaging elements; a second gaging means including a second frame pivotally carried upon the pivot and adjustable angularly upon the pivot with respect to the first frame, a second pair of spaced gaging elements carried by the second frame, the second gaging elements being located a radial distance from the axis of the pivot which is different from the radial distance therefrom of the first pair of gaging elements, and means to adjust the spacing between the second gaging elements; and means to lock the frames in relative angularly adjusted position.

8. A multiple section gage comprising a pivot; gaging means mounted upon the pivot including a first frame carried by the pivot having a pair of arms, each arm having a pivot bearing to receive the pivot, a gaging element carried by each arm and forming a first pair of spaced gaging elements, and means to adjust the angular relation between the two arms and hence adjust the spacing between the gaging elements; a second gaging means including a second frame pivotally carried upon the pivot and adjustable angularly upon the pivot with respect to the first frame, a second pair of spaced gaging elements carried by the second frame, the second gaging elements being located a radial distance from the axis thereof which is different from the radial distance therefrom of the first pair of gaging elements, the two pairs of gaging elements being carried by their respective frames in approximately the same plane, and means to adjust the spacing between the second gaging elements; and means to lock the frames in relative angularly adjusted position.

9. A multiple section gage comprising a pivot; gaging means mounted upon the pivot including a first frame carried by the pivot having a pair of arms, each arm having a pivot bearing to receive the pivot, a gaging element carried by each arm and forming a first pair of spaced gaging elements, and means to adjust the angular relation between the two arms and hence adjust the spacing between the gaging elements; a second gaging means including a second frame pivotally carried upon the pivot and adjustable angularly upon the pivot with respect to the first frame, and having a pair of arms, each arm having a pivot bearing to receive the pivot, a gaging element carried by each arm and forming a second pair of spaced gaging elements, the second gaging elements being located a radial distance from the axis of the pivot which is different from the radial distance therefrom of the first pair of gaging elements, the two pairs of gaging elements being carried by their respective frames in approximately the same plane, and means to adjust the angular relation between the second pairs of arms thereby adjusting the spacing between the second gaging elements; and means to lock the frames in relative angularly adjusted position.

10. A multiple section gage comprising a pivot; gaging means mounted upon the pivot including a first frame carried by the pivot, a first pair of spaced gaging elements carried by the frame, and means for adjusting the spacing between the gaging elements; and a second gaging means including a second frame pivotally carried upon the pivot and adjustable angularly upon the pivot with respect to the first frame, and having a pair of arms, each arm having a pivot bearing of less than 180° to receive the pivot, a gaging element carried by each arm and forming a second pair of spaced gaging elements, the second gaging elements being located a radial distance from the axis of the pivot which is different from the radial distance therefrom of the first pair of gaging elements, and screw means carried by the arms on each side of the pivot bearing to adjust the angular relation between the arms thereby adjusting the spacing between the second gaging elements and to retain the two arms assembled on the pivot.

11. A multiple section gage comprising a pivot; gaging means mounted upon the pivot including a first frame carried by the pivot, a first pair of spaced gaging elements carried by the frame, means for adjusting the spacing between the gaging elements; a second gaging means including a second frame pivotally carried upon the pivot and adjustable angularly upon the pivot with respect to the first frame, and having a pair of arms, each arm having a pivot bearing of less than 180° to receive the pivot, a gaging element carried by each arm and forming a second pair of spaced gaging elements, the second gaging elements being located a radial distance from the axis of the pivot which is different from the radial distance therefrom of the first pair of gaging elements, the two pairs of gaging elements being carried by their respective frames in approximately the same plane, and screw means on each side of the pivot bearing to adjust the angular relation between the arms thereby adjusting the spacing between the second gaging elements and to retain the two arms assembled on the pivot; and means to lock the frames in relative angularly adjusted position.

12. A multiple section gage comprising a pivot; gaging means mounted upon the pivot including a first frame carried by the pivot having a pair of arms, each arm having a pivot bearing of less than 180° to receive the pivot, a gaging element carried by each arm and forming a first pair of spaced gaging elements, and screw means on each side of the pivot bearing to adjust the angular relation between the two arms thereby adjusting the spacing between the gaging elements and to retain the two arms assembled on the pivot; a second gaging means including a second frame pivotally carried upon the pivot and adjustable angularly upon the pivot with respect to the first frame, and having a pair of arms, each arm having a pivot bearing of less than 180° to receive the pivot, a gaging element carried by each arm and forming a second pair of spaced gaging elements, the second gaging elements being located a radial distance from the axis of the pivot which is different from the radial distance therefrom of the first pair of gaging elements, the two pairs of gaging elements being carried by their respective frames in approximately the same plane, and screw means on each side of the pivot bearing to adjust the angular relation between the second pair of arms thereby adjusting the spacing between the second gaging elements and to retain the two arms assembled on the pivot; and means to lock the frames in relative angularly adjusted position.

STANLEY G. JOHNSON.

REFERENCES CITED

The following references are of record in the file of this patent:

UNITED STATES PATENTS

| Number | Name | Date |
|---|---|---|
| 75,827 | Atkins | Mar. 24, 1868 |
| 284,045 | Morrill | Aug. 28, 1883 |
| 1,092,254 | Gardner | Apr. 7, 1914 |
| 1,109,467 | Robinson | Sept. 1, 1914 |
| 1,172,359 | Hess | Feb. 22, 1916 |
| 1,380,624 | Wulz | June 7, 1921 |
| 1,491,098 | Hoke | Apr. 22, 1924 |
| 1,766,546 | Roos | June 24, 1930 |
| 2,086,402 | Countryman | July 6, 1937 |

FOREIGN PATENTS

| Number | Country | Date |
|---|---|---|
| 214,081 | Great Britain | Apr. 17, 1924 |